United States Patent
Guo

(10) Patent No.: US 11,886,893 B2
(45) Date of Patent: Jan. 30, 2024

(54) METHOD AND DEVICE FOR CAPTURING SCREEN AND TERMINAL

(71) Applicant: BEIJING XIAOMI MOBILE SOFTWARE CO., LTD., Beijing (CN)

(72) Inventor: Chumou Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/681,753

(22) Filed: Feb. 26, 2022

(65) Prior Publication Data
US 2023/0047832 A1    Feb. 16, 2023

(30) Foreign Application Priority Data
Aug. 10, 2021   (CN) .......................... 202110913375.7

(51) Int. Cl.
*G06F 3/048*      (2013.01)
*G06F 9/451*      (2018.01)
*G06F 3/0482*     (2013.01)

(52) U.S. Cl.
CPC ............ *G06F 9/451* (2018.02); *G06F 3/0482* (2013.01)

(58) Field of Classification Search
CPC .............................. G06F 3/0482; G06F 9/451
See application file for complete search history.

(56) References Cited

U.S. PATENT DOCUMENTS

| 2015/0058369 A1* | 2/2015 | Kong .................. G06F 16/958 707/756 |
| 2015/0212978 A1* | 7/2015 | He ...................... G06F 9/451 715/273 |
| 2015/0294433 A1* | 10/2015 | Ye ...................... G06F 3/0484 345/418 |
| 2020/0065165 A1* | 2/2020 | Li ...................... G06F 3/0484 |

FOREIGN PATENT DOCUMENTS

| CN | 110515572 A | 11/2019 |
| WO | WO-2021056766 A1 * | 4/2021 ......... H04N 21/4334 |

OTHER PUBLICATIONS

European Patent Application No. 22161751.7, Search and Opinion dated Aug. 1, 2022, 14 pages.

* cited by examiner

*Primary Examiner* — Claudia Dragoescu
(74) *Attorney, Agent, or Firm* — COZEN O'CONNOR

(57) ABSTRACT

A method for capturing a screen includes obtaining a display device list. The display device list at least includes a physical display device and a first category of virtual display device. It is identified whether a value of a flag bit of the first category of virtual display device is a preset value. In response to the value of the flag bit of the first category of virtual display device being the preset value, a video merging result of the physical display device as the screen capturing result.

17 Claims, 3 Drawing Sheets

METHOD AND DEVICE FOR CAPTURING SCREEN AND TERMINAL

CROSS REFERENCE TO RELATED APPLICATION

This application claims priority to Chinese Patent Application No. 202110913375.7, filed on Aug. 10, 2021, the entire content of which is incorporated herein by reference.

TECHNICAL FIELD

The disclosure relates to a field of computer application technologies, and more particularly, to a method and a device for capturing a screen and a terminal.

BACKGROUND

At present, screen capturing is widely used in live broadcast of gaming, teaching, meeting recording, and so on. For example, a game host can capture live screens of a game he/she is playing and upload a screen capturing file to a platform for viewing by users who have not participated in the live broadcast. The user can capture screens of a web conference and record content of the conference based on the screen capturing file.

SUMMARY

According to a first aspect of embodiments of the disclosure, there is provided a method for capturing a screen. The method includes obtaining a display device list, in which the display device list at least includes a physical display device and a first category of virtual display device; identifying whether a value of a flag bit of the first category of virtual display device contained in the display device list is a preset value; determining a video merging result of the physical display device as a screen capturing result in response to the value of the flag bit of the first category of virtual display device being the preset value.

According to a second aspect of embodiments of the disclosure, there is provided an electronic device, including a processor; and a memory, configured to store instructions executable by the processor; in which the processor is configured to execute the instructions to execute a method for capturing a screen according to the first aspect of embodiments of the disclosure.

According to a third aspect of embodiments of the disclosure, there is provided a non-transitory computer readable storage medium. When instructions in the computer readable storage medium are executed by a processor of an electronic device, the electronic device is configured to execute a method for capturing a screen according to the first aspect of embodiments of the disclosure It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of the specification, illustrate embodiments consistent with the disclosure, and together with the description, serve to explain the principles of the disclosure and do not unduly limit the disclosure.

DETAILED DESCRIPTION

In order to make those skilled in the art well understand the technical solution of the disclosure, the technical solutions in embodiments of the disclosure will be clearly and completely described below with reference to the accompanying drawings.

It should be noted that the terms "first", "second" and the like in the description and claims of the disclosure and the above drawings are used to distinguish similar objects, and are not necessarily used to describe a specific sequence or sequence. It is to be understood that the data so used may be interchanged under appropriate circumstances such that embodiments of the disclosure described herein can be practiced in sequences other than those illustrated or described herein. The implementations described in the illustrative examples below are not intended to represent all implementations consistent with this disclosure. Rather, they are merely examples of apparatus and methods consistent with some aspects of the disclosure as recited in the appended claims.

Figure 1:
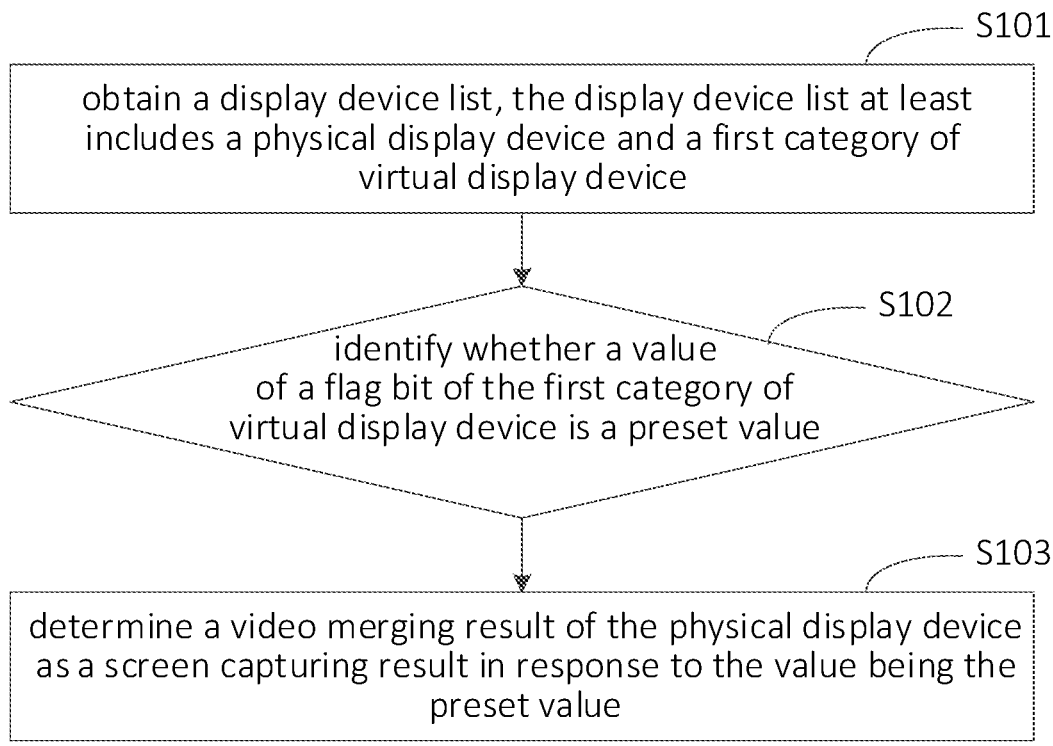
FIG. 1 is a flowchart illustrating a method for capturing a screen according to some embodiments of the disclosure.

FIG. 1 is a flowchart illustrating a method for capturing a screen according to some embodiments of the disclosure. As illustrated in FIG. 1, the method includes the following.

In block S101, a display device list is obtained. The display device list at least includes a physical display device and a first category of virtual display device.

It is to be noted that the execution subject of the method for capturing a screen according to embodiment of the disclosure is an electronic device. The electronic device includes a terminal. The terminal includes but is not limited to a mobile phone, a computer, an intelligent voice interaction device, a smart home appliance, a vehicle-mounted terminal, and the like. The method for capturing a screen according to embodiment of the disclosure may be executed by a device for capturing a screen according to embodiment of the disclosure. The device for capturing a screen according to embodiment of the disclosure may be integrated in any electronic device to execute the method for capturing a screen according to embodiments of the disclosure.

It is to be understood that the display device may include physical display device(s) and virtual display device(s). The physical display device refers to a display device that is a physical entity, including a physical display device of an electronic device itself (such as a screen of a mobile phone itself), an external physical display device (such as an external screen connected to a mobile phone through a transmission line), etc. The virtual display device refers to a display device that is not a physical entity, including a first category of virtual display device(s) and a second category of virtual display device(s). It is to be noted that the first category of virtual display device is configured for capturing a screen. The second category of virtual display device is not used for capturing a screen. For example, the second category of virtual display device can be configured for wireless display (WiFi Display, WFD).

In embodiments of the disclosure, the display device list may be obtained. The display device list at least includes a physical display device and a first category of virtual display device. It is to be noted that the display device list consists of all display devices currently existing on the electronic device. For example, the display device list of a certain mobile phone includes a screen of the mobile phone itself and a first category of virtual display device.

In some embodiments, the display device list may be set in a storage space of the electronic device in advance and may be obtained during capturing a screen.

In block S102, it is identified whether a value of a flag bit of the first category of virtual display device in the display device list is a preset value.

In block S103, in response to the value of the flag bit of the first category of virtual display device being a preset value, a video merging result of the physical display device is used as a screen capturing result.

It is to be noted that, in embodiments of the disclosure, the flag bit may be set for each display device contained in the display device list. The value of the flag bit may be used to determine whether to perform video merging on the display device. It can be understood that the value of the flag bit can be a default value or a preset value, and the default value is different from the preset value. In an example, the default value is false and the default value is true. In another example, the default value is 0 and the default value is 1.

By identifying whether the value of the flag bit of the first category of virtual display device contained in the display device list is the preset value, there is no need to perform the video merging on the first category of virtual display device and the video merging result of the physical display device can be determined as the screen capturing result in response to the value of the flag bit of the first category of virtual display device being the preset value. A type of the video merging result may include video.

Using the video merging result of the physical display device as the screen capturing result may include using the video merging result of the physical display device of the electronic device itself as the screen capturing result. For example, the video merging result of the screen of the mobile phone itself can be used as the screen capturing result.

In some examples, after the video merging result of the physical display device is used as the screen capturing result, the screen capturing result can be stored in a target storage space, such that the screen capturing result can be stored in time, and the user can obtain the screen capturing result from the target storage space.

In some examples, after the video merging result of the physical display device is used as the screen capturing result, the screen capturing result can be output to a video processing device, such that the video processing device can perform video processing on the screen capturing result and generate a processed screen capturing result. The video processing includes but is not limited to video trimming, special effect adding, text adding, picture adding, mosaic processing, which are not limited here. Therefore, the method can output the screen capturing result to the video processing device, such that video processing device performs the video processing on the screen capturing result.

Therefore, automatic video processing on the screen capturing result is realized, which enriches the diversity of the screen capturing result.

With the method for capturing a screen according to embodiments of the disclosure, the display device screen is obtained, it is identified whether the value of the flag bit of the first category of virtual display device is the preset value, and the video merging result of the physical display device as the screen capturing result in response to the value of the flag bit of the first category of virtual display device is the preset value. Therefore, when the value of the flag bit of the first category of virtual display device is the preset value, the video merging result of the physical display device can be directly used as the screen capturing result, and there is no need to perform video merging on the first category of virtual display device. The amount of data for video merging can be effectively reduced, the computing resources of electronic devices can be saved, the power consumption of screen capturing can be effectively reduced, and the heating problem caused by screen capturing can be alleviated.

The above-mentioned display device list further includes a second category of virtual display device, and the second category of virtual display device is not configured for screen capturing.

In some examples, the value of the flag bit may be used to determine whether to perform video merging on the display device. When the value of the flag bit is the preset value, the video merging is not performed on the display device, and the video merging result of the physical display device is used as the video merging result of the display device. On the contrary, when the value of the flag bit is not the preset value, the video merging is performed on the display device, to generate a video merging result of the display device. The display device is any one among the physical display device, the first category of virtual display device, and the second category of virtual display device contained in the display device list.

After the value of the flag bit of the first category of virtual display device is the preset value in block S103, the method can include determining the video merging result of the physical display device as the video merging result of the first category of virtual display device.

Therefore, the method can determine whether to perform video merging on the display device based on the value of the flag bit of the display device, and do not perform the video merging on the display device and directly use the video merging result of the physical display device as the video merging result of the display device when the value of the flag bit is the preset value. The amount of data for the video merging can be effectively reduced.

Figure 2:
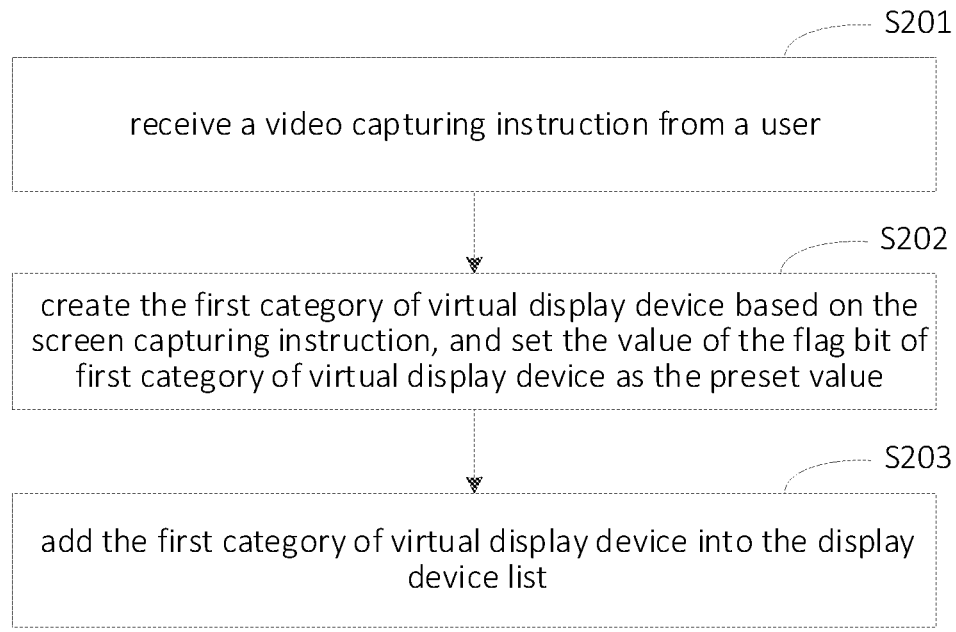
FIG. 2 is a flowchart before obtaining a display device list of a method for capturing a screen according to embodiments of the disclosure.

As illustrated in FIG. 2, before obtaining the display device list in block S101, the method further includes the following.

In block S201, a screen capturing instruction is received from a user.

The user may send a screen capturing instruction to the electronic device, and correspondingly, the electronic device may receive the screen capturing instruction from the user. In an example, the electronic device may monitor the screen capturing instruction of the user, and receive the screen capturing instruction in response to monitoring that there is the screen capturing instruction from the user.

It is to be noted that the type of screen capturing instruction is not limited. For example, the screen capturing instruction includes but is not limited to gesture, text, and voice instructions. For example, the electronic device can receive the screen capturing instruction from the user through a control panel, a touch screen, a voice interaction device, etc.

In block S202, the first category of virtual display device is created based on the screen capturing instruction, and the value of the flag bit of the first category of virtual display device is set as the preset value.

The first category of virtual display device may be created based on the screen capturing instruction. The first category of virtual display device is configured for screen capturing. The value of the flag bit of the first category of virtual display device can be set as the preset value such that the video merging result of the physical display device is directly used as the screen capturing result without performing the video merging on the first category of virtual display device, in response to the value of the flag bit of the first category of virtual display device being the preset value.

Creating the first category of virtual display device based on the screen capturing instruction may include calling a preset screen capturing application (APP) based on the screen capturing instruction, and receiving the display device creating instruction sent by the video capturing application through an application interface, and creating the first category of virtual display device based on the display device creating instruction.

The screen capturing application can be preset in the electronic device such that the preset screen capturing application can be invoked based on the screen capturing instruction. The screen capturing application can send a display device creating instruction to the electronic device through the application interface. The display device creating instruction is configured to create the first category of virtual display device. Accordingly, the electronic device can receive the display device creating instruction sent by the screen capturing application through the application interface, and create the first category of virtual display device based on the display device creating instruction.

In block S203, the first category of virtual display device is added to the display device list.

The first category of virtual display device created based on the screen capturing instruction may be added to the display device list to update the display device list. For example, the identifier information of the first category of virtual display devices may be added to the display device list. As an example, the current display device list includes "Default Display", "HDMI Display", and "Virtual Display 0". If the identifier information of the first category of virtual display device is "Virtual Display 1", the "Virtual Display 1" can be added to the display device list. The updated display device list includes "Default Display", "HDMI Display", "Virtual Display 0", and "Virtual Display 1".

Therefore, the method can create the first category of virtual display device based on the screen capturing instruction from the user, set the value of the flag bit of the first category virtual display device as the preset value, and add the first category of virtual display device in the display device list, to update the display device list. It ensures that the video merging result of the physical display device is directly used as the screen capturing result subsequently without performing the video merging on the first category of virtual display device in response to that the value of the flag bit of the first category of virtual display device is the preset value.

After the display device list is obtained in block S101, the method may include identifying whether the value of the flag bit of each display device among the physical display device, the first category of virtual display device, and the second category of virtual display device included in the display device list is a preset value. In response to the value of the flag bit of any one display device among the display devices not being the preset value, it indicates that it is necessary to perform the video merging on the any one display device. The video merging is performed on the any one display device to generate a video merging result of the any one display device.

For example, the display device list of a mobile phone includes a screen of the mobile phone itself, an external screen connected to the mobile phone through a transmission line, the first category of virtual display device, and the second category of virtual display device. It can be identified whether the value of the flag bit of each display device contained in the display device list is the preset value. In response to that none of the value of the flag bit of the screen of the mobile phone itself, the value of the flag bit of the external screen, and the value of the flag bit of the second category of virtual display device is the preset value, the video merging is performed respectively on the screen of the mobile phone itself, the external screen, and the second category of virtual display device to generate the video merging result of the screen of the mobile phone itself, the video merging result of the external screen, and the video merging result of the second category of virtual display device. Further, in response to that the value of the flag bit of the first category of virtual display device is the preset value, the video merging result of the screen of the mobile phone itself is determined as the video merging result of the first category of virtual display device.

In an example, performing the video merging on any one display device may include obtaining multiple frame images of the any one display device based on a preset updating frequency, and performing the video merging on the multiple frame images. The preset updating frequency can be set based on an actual situation, which is not limited here. For example, the preset updating frequency can be set to 90 Hz (Hertz) per second. Therefore, the method can acquire multiple frame images of the display device based on a fixed updating frequency, which ensure the stability and reliability of the screen capturing, and perform the video merging on the multiple frame images, to realize the video merging of the display device.

Therefore, the method can perform the video merging on the display device to generate the video merging result of the display device when the value of the flag bit of the display device is not the preset value.

After the video merging result of any one display device is generated, the method further includes identifying a category of the any one display device, and display the video merging result of the display device on the display device in response to the category of the any one display device being a physical display device, or storing the video merging result of the any one display device to a corresponding storage space of the display device in response to the category of the any one display device being a virtual display device. It can be understood that each virtual display device has its own storage space for storing the video merging result of the virtual display device.

Identifying the category of the display device may include obtaining the identifier information of the display device and acquiring the category of the display device based on the identifier information. For example, the identifier information may carry category information of the display device, and the category information of the display device may be extracted from the identifier information. For example, if the identifier information of display device A is "Virtual Display 0", the category of the display device A obtained based on the identifier information "Virtual Display 0" can be the virtual display device. If the identifier information of display device B is "Default Display", the category of the display device B obtained based on the identifier information "Default Display" can be the physical display device.

Therefore, after the video merging result of any one display device is obtained, if the category of the any one display device is identified as the physical display device, the method can display the video merging result of the any one display device on the display device such that the video merging result of the physical display device can be displayed in time. If the category of the display device is identified as the virtual display device, the video merging result of the display device can be stored in the storage space corresponding to the display device, such that the video merging result of the virtual display device can be stored in time.

Figure 3:
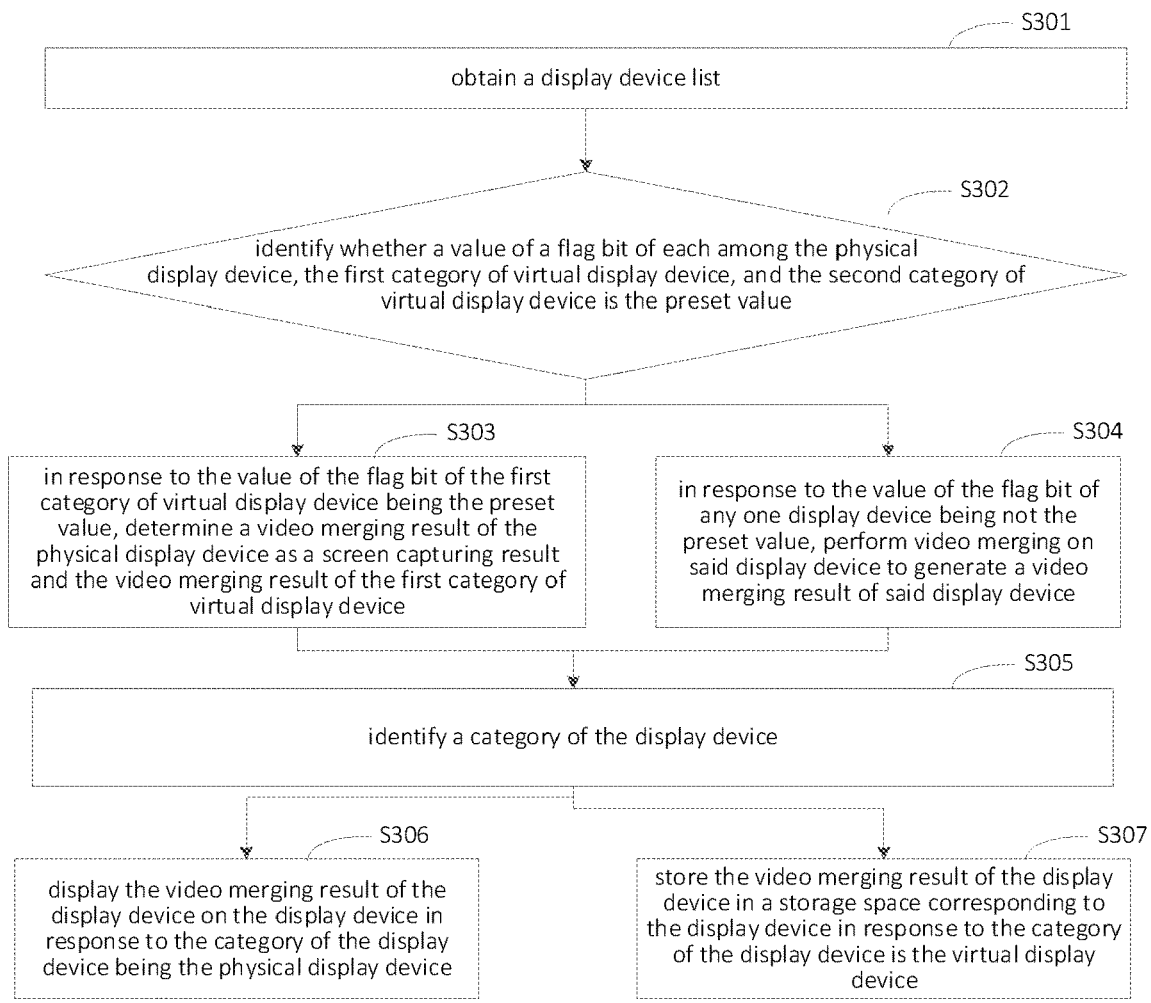
FIG. 3 is a flowchart illustrating a method for capturing a screen according to some embodiments of the disclosure.

For those skilled in the art to understand the disclosure clearly, FIG. 3 is a flowchart illustrating a method for capturing a screen according to some embodiments of the disclosure. As illustrated in FIG. 3, the method may include the following.

In block S301, a display device list is obtained.

In block S302, it is identified whether a value of a flag bit of each display device among the physical display device, the first category of virtual display device, and the second category of virtual display device included in the display device list is a preset value.

In block S303, in response to the value of the flag bit of the first category of virtual display device being the preset value, the video merging result of the physical display device is determined as the screen capturing result and the video merging result of the first category of virtual display device.

In block S304, in response to the value of the flag bit of any one display device not being the preset value, video merging is performed on the any one display device to generate a video merging result of the any one display device.

In block S305, the category of the display device is identified.

In block S306, in response to the category of the display device being the physical display device, the video merging result of the display device is displayed on the display device.

In block S307, in response to the category of the display device being the virtual display device, the video merging result of the display device is stored in a storage space corresponding to the display device.

Specific introduction of blocks S301 to S307 can refer to the description of the relevant content in the above-mentioned embodiments, and details are not repeated here.

Figure 4:
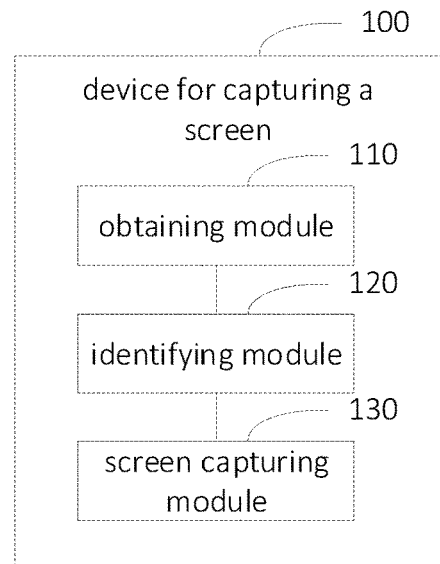
FIG. 4 is a block diagram illustrating a device for capturing a screen according to some embodiments of the disclosure.

FIG. 4 is a block diagram illustrating a device for capturing a screen according to some embodiments of the disclosure. As illustrated in FIG. 4, the device 100 includes an obtaining module 110, an identifying module 120, and a screen capturing module 130.

The obtaining module 110 is configured to obtain a display device list. The display device list at least includes a physical display device and a first category of virtual display device.

The identifying module 120 is configured to identify whether a value of a flag bit of the first category of virtual display device in the display device list is a preset value.

The screen capturing module 130 is configured to use a video merging result of a physical display device as a screen capturing result in response to the value of the flag bit of the first category of virtual display device being the preset value.

The display device list further includes a second category of virtual display device. The identifying module 120 is further configured to identify a value of the flag bit of each display device among the physical display device, the first category of virtual display device, and the second category of virtual display device included in the display device list is the preset value; the. The screen capturing module 130 is further configured perform the video merging on any one display device to generate the video merging result of the any one display device in response to the value of the flag bit of the any one display device not being the preset value.

The screen capturing module 130 is further configured to obtain multiple frame images of the any one display device based on a preset updating frequency and perform the video merging on the multiple frame images.

The device 100 for capturing a screen further includes: a receiving module configured to receive a screen capturing instruction from a user; a creating module configured to create the first category of virtual display device based on the screen capturing instruction and set the value of the flag bit of the first category of virtual display device to the preset value; and an adding module configured to add the first category of virtual display device to the display device list.

The creating module is further configured to call a preset screen capturing application based on the screen capturing instruction; receive a display device creating instruction sent by the screen capturing application through an application interface, and create the first category of virtual display device based on the display device creating instruction.

The screen capturing module 130 is further configured to identify a category of the display device; in response to the category of the display device being a physical display device, display the video merging result of the display device on the display device.

The screen capturing module 130 is further configured to store the video merging result of the display device in a corresponding storage space of the display device in response to the category of the display device being a virtual display device.

The screen capturing module 130 is further configured to determine the video merging result of the physical display device as the video merging result of the first category of virtual display device.

Regarding the device in the above-mentioned embodiments, the specific manner in which each module performs operations has been described in detail in method embodiments, which will not be described in detail here.

With the device for capturing a screen according to embodiments of the disclosure, the display device list can be obtained, and it is identified whether the value of the flag bit of the first category of virtual display device contained in the display device list is the preset value, and the video merging result of the physical display device is determined as the screen capturing result in response to the value of the flag bit of the first category of virtual display device being the preset value. Therefore, when the value of the flag bit of the first category of virtual display device is the preset value, the video merging result of the physical display device can be directly used as the screen capturing result without performing the video merging on the first category of virtual display device, which can effectively reduce the amount of data for the video merging, save the computing resources of the electronic device, effectively reduce the power consumption for the screen capturing, and alleviate a problem of heat generation caused by the screen capturing.

Figure 5:
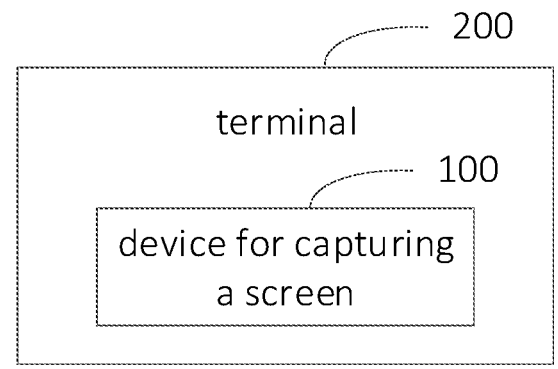
FIG. 5 is a block diagram illustrating a terminal according to some embodiments of the disclosure.

In order to implement the above embodiments, as illustrated in FIG. 5, the disclosure further provides a terminal 200 including the above device 100 for capturing a screen.

The terminal according to embodiments of the disclosure can obtain the display device list, identify whether the value of the flag bit of the first category of virtual display device contained in the display device list is a preset value, and determine the video merging result of the physical display device as the screen capturing result in response to the value of the flag bit of the first category of virtual display device being the preset value. Therefore, when the value of the flag bit of the first category of virtual display device is the preset value, the video merging result of the physical display device can be directly used as the screen capturing result without performing the video merging on the first category of virtual display device, which can effectively reduce the amount of data for the video merging, save the computing resources of the electronic device, effectively reduce the power consumption for the screen capturing, and alleviate a problem of heat generation caused by the screen capturing.

Figure 6:
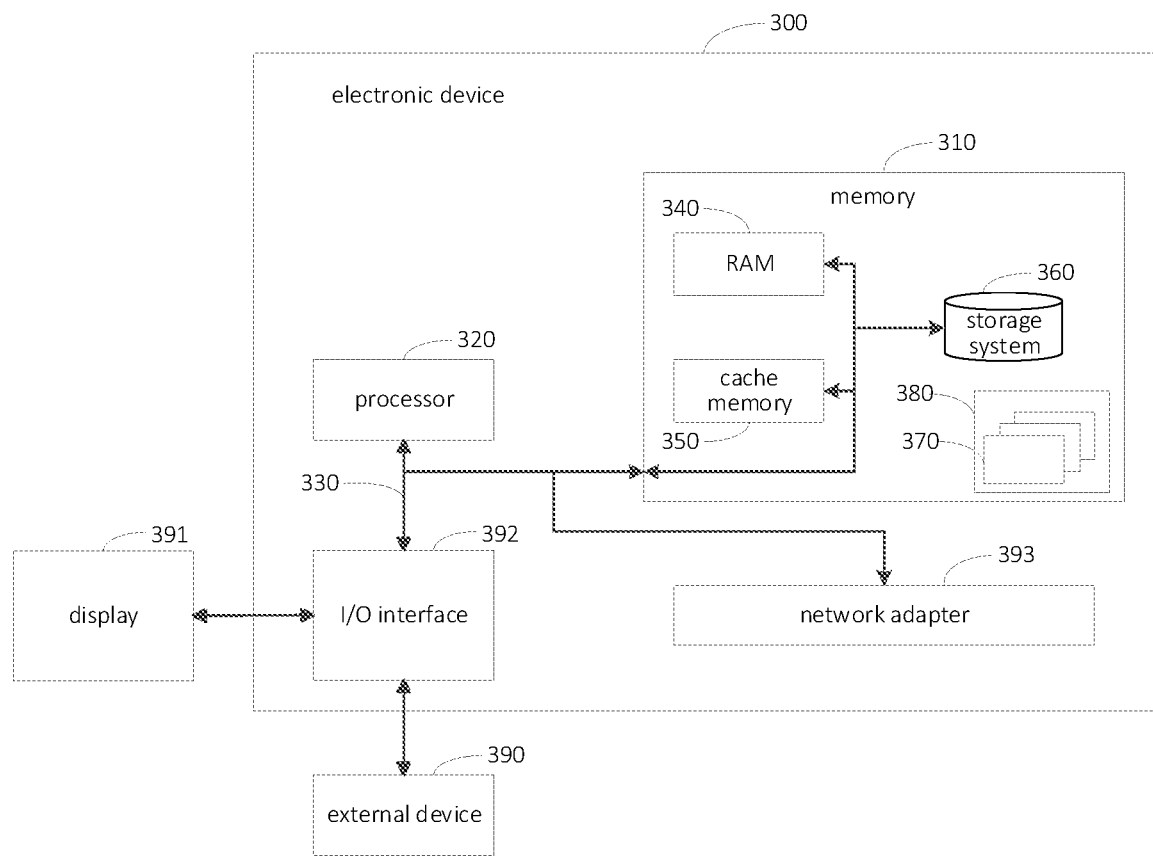
FIG. 6 is a block diagram illustrating an electronic device according to some embodiments of the disclosure.

FIG. 6 is a block diagram illustrating an electronic device 300 according to some embodiments of the disclosure.

As illustrated in FIG. 6, the above-mentioned electronic device 300 includes a memory 310, a processor 320, and a bus 330 connecting different components (including the memory 310 and the processor 320).

The memory 310 stores a computer program. When the processor 320 executes the program, the method for capturing a screen described in embodiments of the disclosure is implemented.

The bus 330 represents one or more of several types of bus structures, including a memory bus or memory controller, a peripheral bus, a graphics acceleration port, a processor, or a local bus using any of a variety of bus structures. By way of examples, these architectures include, but are not limited to, Industry Standard Architecture (ISA) bus, Micro Channel Architecture (MAC) bus, Enhanced ISA bus, Video Electronics Standards Association (VESA) local bus, and Peripheral Component Interconnect (PCI) bus.

The electronic device 300 typically includes a variety of electronic device-readable media. These media can be any available media that can be accessed by the electronic device 300, including volatile and non-volatile media, removable and non-removable media.

The memory 310 may also include a computer system readable medium in a form of volatile memory, such as random access memory (RAM) 340 and/or cache memory 350. The electronic device 300 may further include other removable/non-removable, volatile/non-volatile computer system storage media. For example, the storage system 360 may be used to read and write to non-removable, non-volatile magnetic media (not illustrated in FIG. 6, commonly referred to as a "hard drive"). Although not illustrated in FIG. 6, a disk drive may be provided for reading and writing to removable non-volatile magnetic disks (e.g., "floppy disks"), as well as removable non-volatile optical disks (e.g., CD-ROM, DVD-ROM or other optical media) to read and write optical drives. In these cases, each drive may be connected to bus 330 through one or more data media interfaces. The memory 310 may include at least one program product having a set (e.g., at least one) of program modules configured to perform the functions of various embodiments of the disclosure.

A program/utility 380 having a set (at least one) of program modules 370, which may be stored, for example, in the memory 310, such program modules 370 can include, but not limited to, an operating system, one or more application programs, other programs modules and program data. Each or some combination of these examples may include an implementation of a network environment. The program modules 370 generally perform the functions and/or methods according to the embodiments of the disclosure.

The electronic device 300 may also communicate with one or more external devices 390 (e.g., keyboard, pointing device, display 391, etc.), one or more devices that enable a user to interact with the electronic device 300, and/or any device (e.g., network card, modem, etc.) that enables the electronic device 300 to communicate with one or more other computing devices. Such communication may occur through an input/output (I/O) interface 392. The electronic device 300 may communicate with one or more networks (e.g., a local area network (LAN), a wide area network (WAN), and/or a public network such as the Internet) through a network adapter 393. As illustrated in FIG. 6, the network adapter 393 communicates with other modules of the electronic device 300 through the bus 330. It should be understood that, although not shown, other hardware and/or software modules may be used in conjunction with electronic device 300, including but not limited to, microcode, device drivers, redundant processing units, external disk drive arrays, RAID systems, tape drives and data backup storage systems.

The processor 320 executes various functional applications and data processing by executing programs stored in the memory 310.

It should be noted that, for the implementation process and technical principle of the electronic device in this embodiment, reference may be made to the foregoing explanation of the method for capturing a screen according to embodiments of the disclosure, and details are not repeated here.

The electronic device according to embodiments of the disclosure can execute the above-mentioned method for capturing a device, i.e., obtain the display device list, identify whether the value of the flag bit of the first category of virtual display device contained in the display device list is a preset value, and determine the video merging result of the physical display device as the screen capturing result in response to the value of the flag bit of the first category of virtual display device being the preset value. Therefore, when the value of the flag bit of the first category of virtual display device is the preset value, the video merging result of the physical display device can be directly used as the screen capturing result without performing the video merging on the first category of virtual display device, which can effectively reduce the amount of data for the video merging, save the computing resources of the electronic device, effectively reduce the power consumption for the screen capturing, and alleviate a problem of heat generation caused by the screen capturing.

In order to implement the above embodiments, the disclosure also provides a computer-readable storage medium.

When the instructions in the computer-readable storage medium are executed by the processor of the electronic device, the electronic device can execute the above-mentioned method for capturing a screen. Alternatively, the computer-readable storage medium may be ROM, random access memory (RAM), CD-ROM, magnetic tape, floppy disk, optical data storage device, and the like.

In order to implement the above embodiments, the disclosure also provides a computer program product, including computer programs/instructions. When the computer programs/instructions are executed by a processor of an electronic device, the aforementioned method for capturing a screen is implemented.

Embodiments of the disclosure provide a method for capturing a screen. The method includes obtaining a display device list, in which the display device list at least includes a physical display device and a first category of virtual display device; identifying whether a value of a flag bit of the first category of virtual display device contained in the display device list is a preset value; determining a video merging result of the physical display device as a screen capturing result in response to the value of the flag bit of the first category of virtual display device being the preset value.

In some embodiments, the display device list includes a second category of virtual display device. The method further includes identifying whether a value of a flag bit of each display device among the physical display device, the first category of virtual display device, and the second category of virtual display device included in the display device list is the preset value; and in response to the value of the flag bit of any one display device not being the preset value, performing video merging on the any one display device to generate a video merging result of the any one display device.

In some embodiments, performing the video merging on the any one display device includes: obtaining multiple frame images of the any one display device based on a preset updating frequency; and performing the video merging on the multiple frame images.

In some embodiments, before obtaining the display device list, the method further includes receiving a video capturing instruction from a user; creating the first category of virtual display device based on the screen capturing instruction, and setting the value of the flag bit of first category of virtual display device as the preset value; and adding the first category of virtual display device into the display device list.

In some embodiments, creating the first category of virtual display device based on the screen capturing instruction includes calling a preset screen capturing application based on the screen capturing instruction; and receiving a display device creating instruction sent by the screen capturing application through an application interface, and creating the first category of virtual display device based on the display device creating instruction.

In some embodiments, after generating the video merging result of the display device, the method further includes identifying a category of the display device; and displaying the video merging result of the display device on the display device in response to the category of the display device being the physical display device.

In some embodiments, the method further includes storing the video merging result of the display device in a storage space corresponding to the display device in response to the category of the display device being the virtual display device.

In some embodiments, the method further includes determining the video merging result of the physical display device as the video merging result of the first category of virtual display device.

Embodiments of the disclosure further provide a device for capturing a screen. The method includes an obtaining module, configured to obtain a display device list, in which the display device list at least includes a physical display device and a first category of virtual display device; an identifying module, configured to identify whether a value of a flag bit of the first category of virtual display device contained in the display device list is a preset value; and a screen capturing module, configured to determine a video merging result of the physical display device as a video capturing result in response to the value of the flag bit of the first category of virtual display device being the preset value.

In some embodiments, the display device list further includes a second category of virtual display device; the identifying module is further configured to identify whether a value of a flag bit of each display device among the physical display device, the first category of virtual display device, and the second category of virtual display device included in the display device list is the preset value; and the screen capturing module is further configured to, in response to the value of the flag bit of any one display device not being the preset value, perform video merging on the any one display device to generate a video merging result of the any one display device.

In some embodiments, the screen capturing module is further configured to: obtain multiple frame images of the any one display device based on a preset updating frequency; and perform the video merging on the multiple frame images.

In some embodiments, the device further includes a receiving module, configured to receive a video capturing instruction from a user; a creating module, configured to create the first category of virtual display device based on the screen capturing instruction, and set the value of the flag bit of first category of virtual display device as the preset value; and an adding module, configured to add the first category of virtual display device into the display device list.

In some embodiments, the creating module is further configured to: call a preset screen capturing application based on the screen capturing instruction; and receive a display device creating instruction sent by the screen capturing application through an application interface, and create the first category of virtual display device based on the display device creating instruction.

In some embodiments, the screen capturing module is further configured to: identify a category of the display device; and display the video merging result of the display device on the display device in response to the category of the display device being the physical display device.

In some embodiments, the screen capturing module is further configured to: store the video merging result of the display device in a storage space corresponding to the display device in response to the category of the display device is the virtual display device.

In some embodiments, the screen capturing module is further configured to: determine the video merging result of the physical display device as the video merging result of the first category of virtual display device.

Embodiments of the disclosure further provide a terminal, including the device for capturing a screen as described above.

Embodiments of the disclosure further provide an electronic device, including a processor; and a memory, configured to store instructions executable by the processor; in which the processor is configured to execute the instructions to execute a method for capturing a screen as described above.

Embodiments of the disclosure further provide a non-transitory computer readable storage medium. When instructions in the computer readable storage medium are executed by a processor of an electronic device, the electronic device is configured to execute a method for capturing a screen as described above.

Other embodiments of the disclosure will readily occur to those skilled in the art upon consideration of the specification and practice of the disclosure. This disclosure is intended to cover any variations, uses, or adaptations of this disclosure that follow the general principles of this disclosure and include common general knowledge or techniques in the technical field not disclosed by this disclosure. The specification and examples are to be regarded as exemplary only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the disclosure is limited only by the appended claims.

What is claimed is:

1. A method for capturing screen, comprising:
    obtaining a display device list, wherein the display device list comprises a physical display device and a first category of virtual display device;
    identifying whether a value of a flag bit of the first category of virtual display device in the display device list is a preset value; and
    determining a video merging result of the physical display device as a screen capturing result in response to the value of the flag bit of the first category of virtual display device being the preset value, wherein the video merging result of the physical display device is directly used as the screen capturing result, so that video merging is not performed on the first category of virtual display device,
    wherein the display device list further comprises a second category of virtual display device, the method further comprising:
    identifying whether a value of a flag bit of each display device among the physical display device, the first category of virtual display device, and the second category of virtual display device included in the display device list is the preset value; and
    in response to the value of the flag bit of any one display device not being the preset value, performing video merging on the any one display device to generate a video merging result of the any one display device.

2. The method of claim 1, wherein performing the video merging on the any one display device comprises:
    obtaining multiple frame images of the any one display device based on a preset updating frequency; and
    performing the video merging on the multiple frame images.

3. The method of claim 1, further comprising:
    receiving a video capturing instruction from a user;
    creating the first category of virtual display device based on the screen capturing instruction, and setting the value of the flag bit of first category of virtual display device as the preset value; and
    adding the first category of virtual display device into the display device list.

4. The method of claim 3, wherein creating the first category of virtual display device based on the screen capturing instruction comprises:
    calling a preset screen capturing application based on the screen capturing instruction; and
    receiving a display device creating instruction sent by the screen capturing application through an application interface, and creating the first category of virtual display device based on the display device creating instruction.

5. The method of claim 1, further comprising:
    identifying a category of the display device; and
    displaying the video merging result of the display device on the display device in response to the category of the display device being the physical display device.

6. The method of claim 5, further comprising:
    storing the video merging result of the display device in a storage space corresponding to the display device in response to the category of the display device is the virtual display device.

7. The method of claim 1, further comprising:
    determining the video merging result of the physical display device as the video merging result of the first category of virtual display device.

8. An electronic device, comprising:
    a processor; and
    a memory, configured to store instructions executable by the processor;
    wherein the processor is configured to:
    obtain a display device list, wherein the display device list comprises a physical display device and a first category of virtual display device;
    identify whether a value of a flag bit of the first category of virtual display device in the display device list is a preset value; and
    determine a video merging result of the physical display device as a screen capturing result in response to the value of the flag bit of the first category of virtual display device being the preset value, wherein the video merging result of the physical display device is directly used as the screen capturing result, so that video merging is not performed on the first category of virtual display device,
    wherein the display device list further comprises a second category of virtual display device, and the processor is further configured to:
    identify whether a value of a flag bit of each display device among the physical display device, the first category of virtual display device, and the second category of virtual display device included in the display device list is the preset value; and
    in response to the value of the flag bit of any one display device not being the preset value, perform video merging on the any one display device to generate a video merging result of the any one display device.

9. The electronic device of claim 8, wherein the processor is further configured to:
    obtain multiple frame images of the any one display device based on a preset updating frequency; and
    perform the video merging on the multiple frame images.

10. The electronic device of claim 8, wherein the processor is further configured to:
    receive a video capturing instruction from a user;
    create the first category of virtual display device based on the screen capturing instruction, and set the value of the flag bit of first category of virtual display device as the preset value; and
    add the first category of virtual display device into the display device list.

11. The electronic device of claim 10, wherein the processor is further configured to:
    call a preset screen capturing application based on the screen capturing instruction; and receive a display device creating instruction sent by the screen capturing application through an application interface, and create the first category of virtual display device based on the display device creating instruction.

12. The electronic device of claim 8, wherein the processor is further configured to:
    identify a category of the display device; and
    display the video merging result of the display device on the display device in response to the category of the display device being the physical display device.

13. The electronic device of claim 12, wherein the processor is further configured to:
    store the video merging result of the display device in a storage space corresponding to the display device in response to the category of the display device is the virtual display device.

14. The electronic device of claim 8, wherein the processor is further configured to:
    determine the video merging result of the physical display device as the video merging result of the first category of virtual display device.

15. A non-transitory computer readable storage medium, wherein when instructions in the computer readable storage medium are executed by a processor of an electronic device, the electronic device is configured to execute a method for capturing a screen, the method comprising:
    obtaining a display device list, wherein the display device list comprises a physical display device and a first category of virtual display device;
    identifying whether a value of a flag bit of the first category of virtual display device in the display device list is a preset value; and
    determining a video merging result of the physical display device as a screen capturing result in response to the value of the flag bit of the first category of virtual display device being the preset value, wherein the video merging result of the physical display device is directly used as the screen capturing result, so that video merging is not performed on the first category of virtual display device,
    wherein the display device list further comprises a second category of virtual display device, the method further comprising:
    identifying whether a value of a flag bit of each display device among the physical display device, the first category of virtual display device, and the second category of virtual display device included in the display device list is the preset value; and
    in response to the value of the flag bit of any one display device not being the preset value, performing video merging on the any one display device to generate a video merging result of the any one display device.

16. The non-transitory computer readable storage medium of claim 15, wherein performing the video merging on the any one display device comprises:
    obtaining multiple frame images of the any one display device based on a preset updating frequency; and
    performing the video merging on the multiple frame images.

17. The non-transitory computer readable storage medium of claim 15, the method further comprising:
    receiving a video capturing instruction from a user;
    creating the first category of virtual display device based on the screen capturing instruction, and setting the value of the flag bit of first category of virtual display device as the preset value; and
    adding the first category of virtual display device into the display device list.

* * * * *